(12) United States Patent
Lehto et al.

(10) Patent No.: US 7,713,004 B2
(45) Date of Patent: May 11, 2010

(54) TOOL FOR CHIP REMOVING MACHINING AS WELL AS A BASIC BODY THEREFORE

(75) Inventors: Ralf Lehto, Gävle (SE); Magnus Örtlund, Stockholm (SE); Isak Kakai, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 181 days.

(21) Appl. No.: 12/125,729

(22) Filed: May 22, 2008

(65) Prior Publication Data

US 2008/0304923 A1 Dec. 11, 2008

(30) Foreign Application Priority Data

Jun. 4, 2007 (SE) .................................. 0701368

(51) Int. Cl.
*B23B 51/02* (2006.01)
*B23B 51/06* (2006.01)
(52) U.S. Cl. .......................................... 407/33; 407/30
(58) Field of Classification Search .................. 407/30, 407/33, 34, 66, 113–116; 403/273, 341; 408/227, 228, 231–233, 22, 713, 230, 343
See application file for complete search history.

(56) References Cited

U.S. PATENT DOCUMENTS 6,312,201 B1 11/2001 Nagaya et al.

2007/0248421 A1* 10/2007 Kakai et al. .................. 407/34

FOREIGN PATENT DOCUMENTS

| WO | WO 99/39076 | 8/1999 |
|---|---|---|
| WO | WO 02/14005 | 2/2002 |
| WO | WO 03/068436 | 8/2003 |
| WO | WO 2006/118503 | 11/2006 |

* cited by examiner

*Primary Examiner*—Will Fridie, Jr.
(74) *Attorney, Agent, or Firm*—Drinker Biddle & Reath LLP

(57) ABSTRACT

A tool for chip removing machining, including a long narrow basic body having an envelope surface which is concentric with a center axis, and two opposite ends, and a replaceable loose top which is connected to the basic body via a first coupling that includes a first seating formed in one end of the basic body and a first male element formed in one end of the loose top. The basic body includes a primary part body made of a first material having a first modulus of elasticity, and a secondary part body which includes the first seating and is made of a second material having a second modulus of elasticity which is lower than the first modulus of elasticity. The two part bodies of the basic body are interconnected via a second coupling which includes a second seating in the secondary part body as well as a second male element that is formed on the primary part body and has one or more precision machined flank surfaces that are arranged to apply, together with one or more co-operating and precision machined flank surfaces of the second seating, joining axial forces to the part bodies by turning the part bodies in relation to each other.

17 Claims, 3 Drawing Sheets

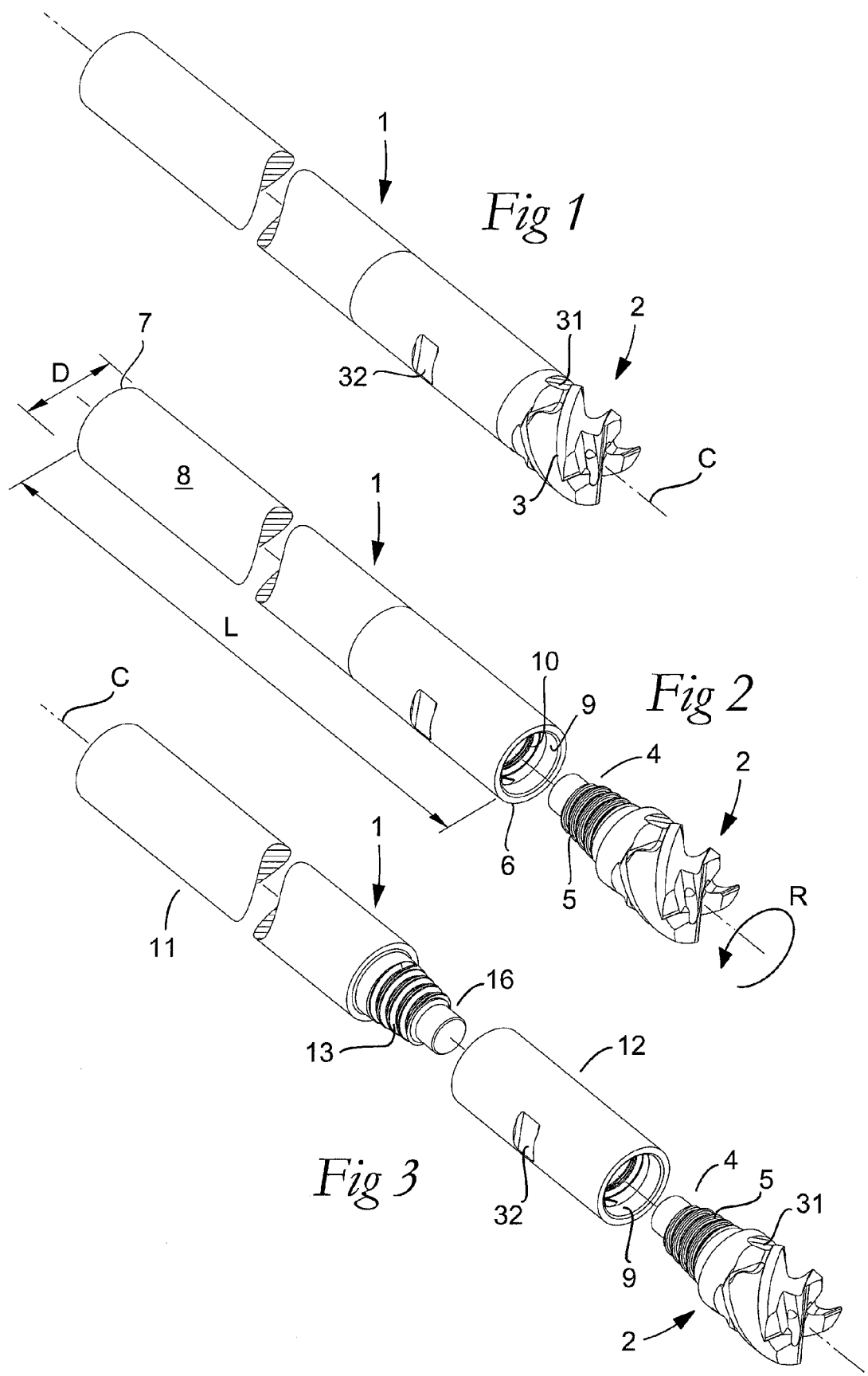

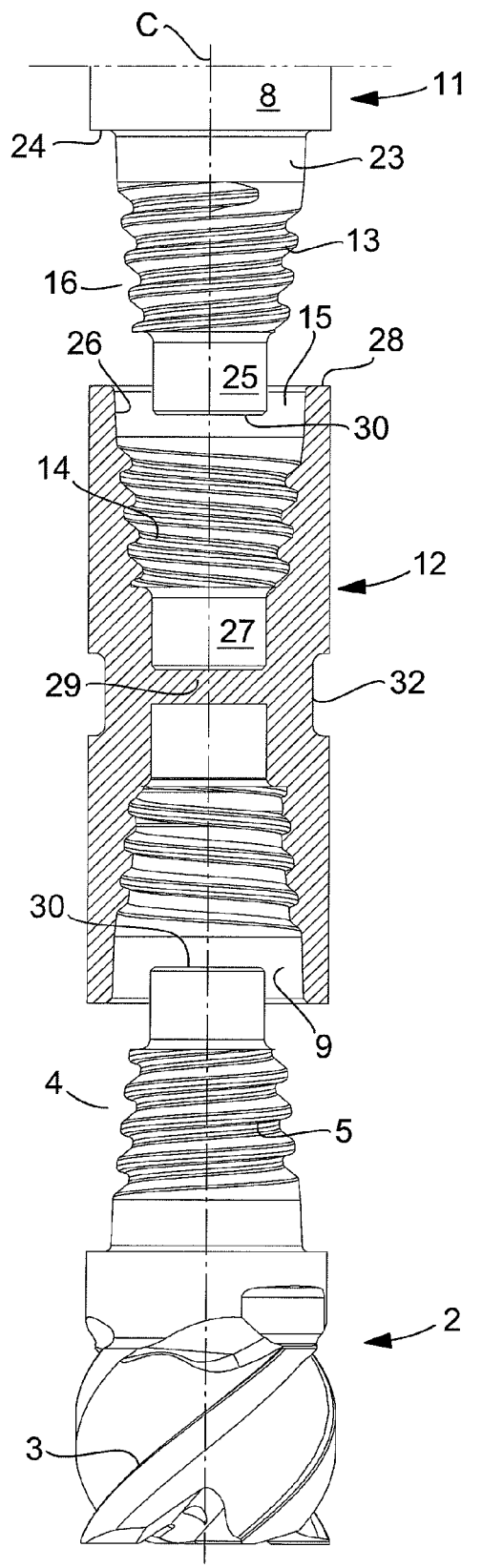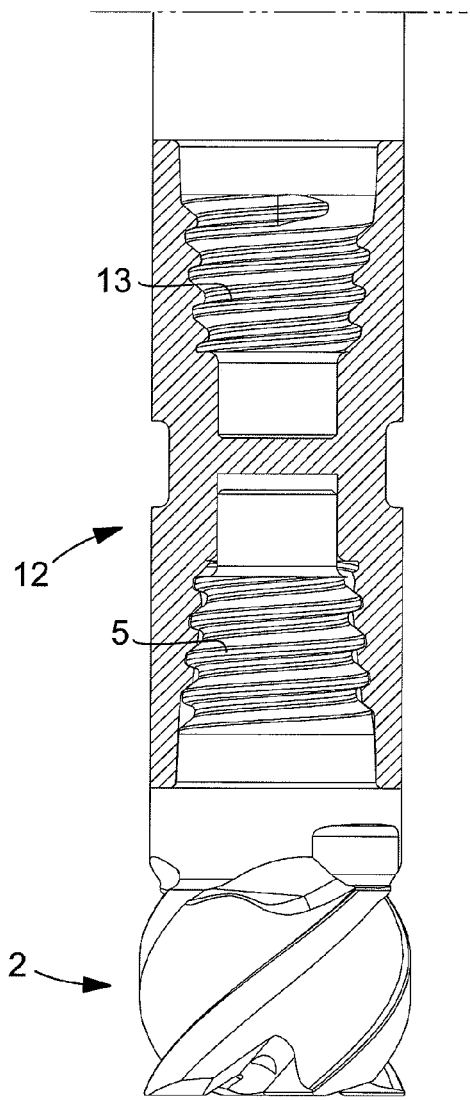
Fig 4
Fig 5

TOOL FOR CHIP REMOVING MACHINING AS WELL AS A BASIC BODY THEREFORE

This application claims priority under 35 U.S.C. §119 to Swedish Patent Application No. 0701368-3, filed on Jun. 5, 2007, which is incorporated by reference herein in its entirety.

FIELD OF THE INVENTION

The present invention relates generally to a tool for chip removing or cutting machining of the type that includes, on one hand, a long narrow basic body having an envelope surface, which is concentric with a center axis, and two ends, and on the other hand a replaceable loose top, which is connected to the basic body via a coupling that includes a seating formed in one end of the basic body and a male element formed in one end of the loose top, the basic body being composed of a primary part body of cemented carbide or a similar material having a first, high modulus of elasticity, as well as a secondary part body, which includes the seating and is made of steel having a second modulus of elasticity which is considerably lower than the first one. The invention also relates to a basic body as such. Tools of this type are in practice intended for the machining of workpieces of metal, such as steel and steel alloys, iron, aluminum, titanium, et cetera.

BACKGROUND OF THE INVENTION

The invention has its origin in problems associated with slender cutting tools of the type that include two parts interconnected via an interface or a coupling, the parts being a long narrow basic body and a cutting body or wear part that is detachably connected with the same and of the type that is denominated loose top by those skilled in the art. In practice, such tools may be rotatable and be in the form of drills or milling cutters, e.g., shank-end mills or contour mills. In these tools, the basic body is usually manufactured from steel and the loose top from cemented carbide or the like, i.e., a material that is harder than steel by having a considerably greater modulus of elasticity than steel. The most common type of coupling between the basic body and the loose top makes use of a male member that protrudes from the rear end of the loose top and is inserted into and locked in a seating in the front end of the basic body. Many tools of the kind in question are fairly slender so far that their length is many times greater than the diameter. It is then—with the purpose of counteracting bending phenomena and vibrations—desirable to improve the stiffness and stability of the basic body by manufacturing the same from a material that has a greater modulus of elasticity than steel, e.g., cemented carbide. However, if the male and female coupling between the basic body and the loose top require grinding or another precision machining, such as is the case with thread couplings, problems arise, because internal machining in cemented carbide is difficult, if not impossible, to carry out with good precision.

In order to solve the above-mentioned problems, it has previously been tried to solder a steel body onto the front end of a part body of cemented carbide or the like, in the front end of which steel body a female thread can be ground internally. However, this solution has turned out to be unreliable because soldering is a manual operation, which lacks accurate repeatability. In other words, the important coaxiality between the steel body and the cemented carbide body may be difficult to attain. In addition, the soldered seam forms in practice a permanent joint, which entails that the basic body in its entirety has to be discarded also in such cases when only the front steel body is damaged, but not the rear cemented carbide body.

Another proposed solution is presented in U.S. Pat. No. 6,312,201 B1, which shows a cutting tool of the initially generally mentioned kind. More precisely, the cutting tool in question includes front and rear tool bodies of cemented carbide or the like, which are formed with male members each surrounded by a ring of steel, which is, shrunk onto the male members. However, the shrink fit has the disadvantage that replacement of worn loose tops become highly intricate and time-consuming. In addition, the coaxiality of the loose top and basic body may be impaired if the generation of heat in the tool becomes great.

The present invention aims at obviating the above-mentioned disadvantages of previously known tools of the kind in question and at providing an improved tool. Therefore, an object of the invention is to provide a tool, the basic body of which can be generally made of cemented carbide or another stiff material, and in spite of this be formed with a seating that can be machined internally at high accuracy. In particular, it should be possible to form the seating of the basic body with a precision-machined female thread for the co-operation with an externally ground male thread of a male element included in the loose top, with the purpose of attaining a good coaxiality and a reliable interconnection of the loose top and the basic body.

Another object of the invention is to provide a tool, the coupling of which between the loose top and the stiff basic body allows quick mounting and dismounting of the loose top.

Yet another object of the invention is to provide a tool, the basic body of which to a major extent can be re-used, even if the front part thereof adjacent to the seating would be damaged or in another way become unusable.

SUMMARY OF THE INVENTION

In an embodiment, the invention provides a tool for chip removing machining, including a long narrow basic body having an envelope surface which is concentric with a center axis, and two opposite ends, and a replaceable loose top which is connected to the basic body via a first coupling that includes a first seating formed in one end of the basic body and a first male element formed in one end of the loose top. The basic body includes a primary part body made of a first material having a first modulus of elasticity, and a secondary part body which includes the first seating and is made of a second material having a second modulus of elasticity which is lower than the first modulus of elasticity. The two part bodies of the basic body are interconnected via a second coupling which includes a second seating in the secondary part body as well as a second male element that is formed on the primary part body and has one or more precision machined flank surfaces that are arranged to apply, together with one or more co-operating and precision machined flank surfaces of the second seating, joining axial forces to the part bodies by turning the part bodies in relation to each other.

In another embodiment, the invention provides a long narrow basic body for tools for chip removing machining, having an envelope surface which is concentric with a center axis, two opposite ends, and a first seating formed in one end that receives a first male coupling element. The basic body includes a primary part body made of a material having a first modulus of elasticity, and a secondary part body which includes the first seating and is made of a material having a second modulus of elasticity which is lower than the first modulus of elasticity. The two part bodies are interconnected via a coupling, which includes a second seating in the secondary part body, and a second male element that is formed on the primary part body and has one or more precision machined flank surfaces that are arranged to apply, together with one or more co-operating precision machined flank surfaces of the second seating, joining axial forces to the part bodies by turning the part bodies in relation to each other.

The invention is based on the idea of composing the basic body of the tool of two part bodies, one of which is a comparatively long, for example, cemented carbide body, and the other a shorter, for example, steel body in the form of a sleeve, which in a preferred embodiment includes female threads into which male threads of the first part body, as well as of the loose top may be fastened. In such a way, the awkward, internal fine finishing of the female threads, e.g., by turning and/or grinding, can be carried out in steel, which is easy to machine. Simultaneously, the male threads in the hard-to-be-machined cemented carbide in the first part body and the loose top, respectively, can be formed exclusively by external machining, which can be carried out with good results in respect of dimensional accuracy and surface smoothness.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 1 is a perspective view, showing a cutting tool made in accordance with an embodiment of the invention in the form of a shank-end mill in an assembled state, ready for use;

FIG. 2 is a perspective exploded view, showing a loose top included in the tool and spaced-apart from the basic body of the tool;

FIG. 3 is a perspective exploded view, showing two part bodies included in the basic body and spaced-apart from each other;

FIG. 4 is an exploded view, showing a sleeve-like part body, included in the basic body, in an enlarged longitudinal section spaced-apart from the primary part body as well as from the loose top;

FIG. 5 is a corresponding longitudinal section, showing the sleeve body connected with the loose top and the primary part body.

DETAILED DESCRIPTION OF THE PREFERRED EMBODIMENTS

Figure 6:
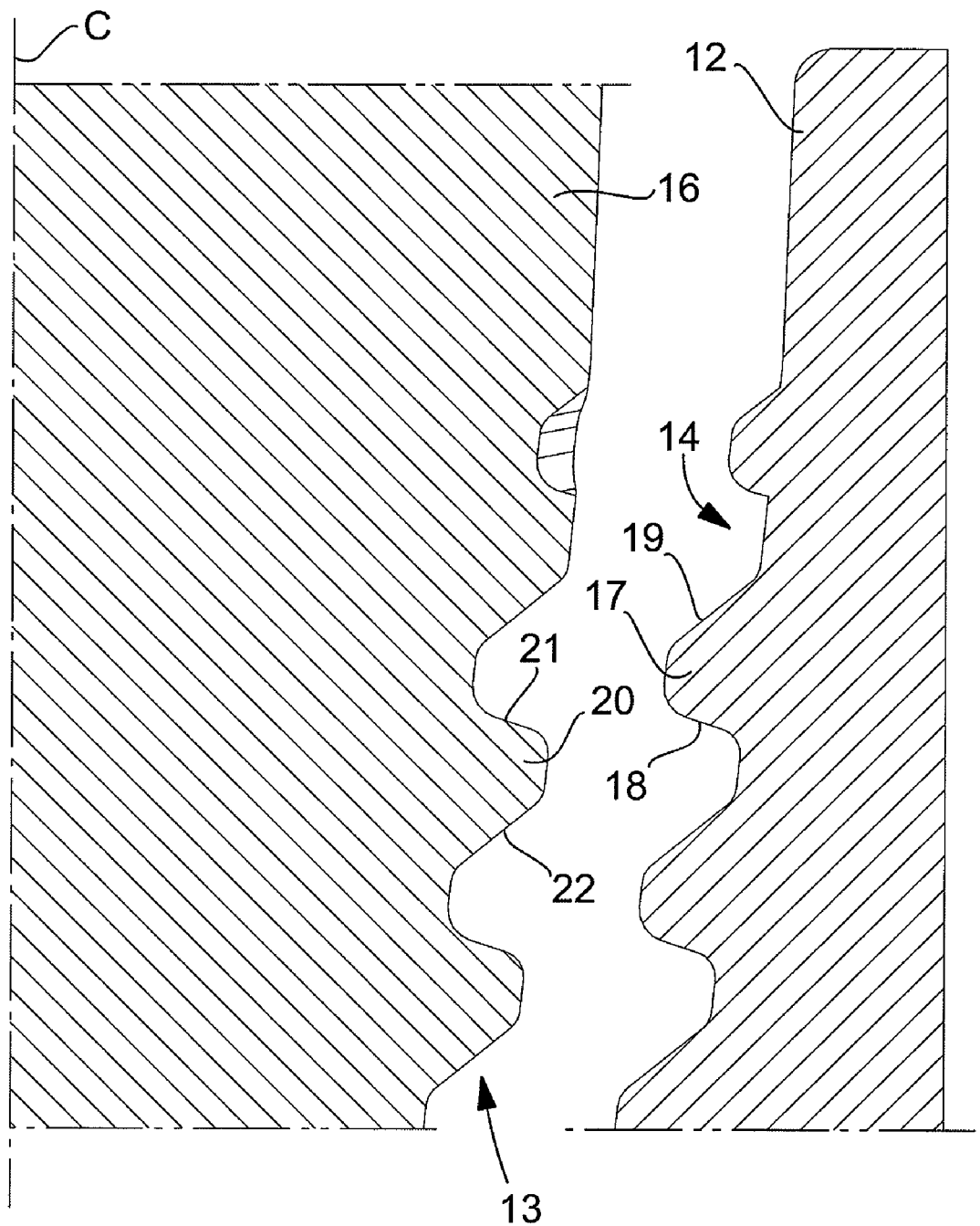
FIG. 6 is an enlarged part section illustrating a thread coupling between the two part bodies of the basic body.

The exemplified tool shown in the drawings is in the form of a shank-end mill, which includes a basic body 1 and a replaceable wear body or loose top 2. In the last-mentioned one, a number of cutting edges 3 for the chip removing machining are included. In the rear end thereof, the loose top is formed with a male element 4 in which a male thread 5 is included for the connection of the loose top with the basic body. Advantageously, the loose top 2 is in its entirety manufactured from cemented carbide or another hard material, such as cermet, ceramics or the like. The tool is rotatable around a center axis C, more precisely, in the direction of rotation R.

The basic body 1 has a long narrow, rotationally symmetrical basic shape and extends between front and rear ends 6 and 7, respectively, the envelope surface 8 thereof being concentric with the center axis C. In the front end 6, a seating 9 mouths, in the interior of which a female thread 10 is formed for the co-operation with the male thread 5 of the loose top. Together, the threads 5, 10 form a first coupling. The length of the basic body 1 between the ends 6, 7 is designated L, while the diameter thereof is designated D. Advantageously—though not necessarily—the basic body 1 has one and the same diameter along the entire length L thereof. In other words, in the example, the envelope surface 8 is genuinely cylindrical. In an embodiment, the invention is of interest in connection with slender tools, i.e., tools, the basic bodies of which have a length L that is considerably greater than the diameter D. In practice, the relationship L/D may amount to 5:1 or more. The embodiment is particularly interesting in tools having small diameters, e.g., within the range of 10-20 mm, although the same also may be applied when the diameters are larger in absolute numbers.

As is seen in FIGS. 1-3, the basic body 1 includes two part bodies, viz. a primary, rear part body 11, and a secondary, front part body 12. Among these part bodies, the rear one 11 is longer than the front one 12. Suitably, the part body 11 is at least two times longer than the part body 12. The material of the part body 11 is cemented carbide or the like, while the part body 12 is formed of steel. In other words, the material of the part body 11 has a modulus of elasticity that is considerably higher than the modulus of elasticity of the part body 12. This choice of material of the long part body 11 ensures good stiffness of the assembled basic body 1.

According to an embodiment of the invention, the two part bodies 11, 12 are interconnected via a second coupling, which in the example is a thread coupling including a male thread 13 included in the primary part body 11 as well as a female thread 14 (see also FIGS. 4 and 5) of a second seating 15 in the secondary part body 12. Like the first male thread 5, the second male thread 13 is formed on a male element or stud 16, which is formed on the front end of the part body 11. In practice, the two threaded joints that form first and second couplings between, on one hand, the loose top 2 and the part body 12, and on the other hand the part bodies 11, 12, may be identical in respect of the design of the thread ridges. In particular, threads of the type disclosed in U.S. Patent Application Publication No. 2007/0248421 are preferred. Characteristic of such threads is, as is seen from the detailed section in FIG. 6, that the two flank surfaces of the individual thread ridge are differently angled in relation to the center axis of the thread. Thus, in FIG. 6 it is seen that the thread ridge 17 of a female thread, which is represented by the female thread 14, includes two flank surfaces 18, 19 the first-mentioned one of which forms a steeper angle with the center axis C of the thread than the second one. In an analogous way, the thread ridge 20 of the male thread 13 is formed with first and second flank surfaces 21, 22, the first one 21 of which is inclined at a steeper angle than the second one 22. When the male thread 13 is tightened into the female thread 14, the flank surfaces 18, 21 act pulling, while the other flank surfaces 19, 22 are inactive. By the fact the thread ridge includes much material behind the pulling flank surfaces 18, 21, the male thread can be loaded with a considerably greater force than conventional thread ridges having equiangular flank surfaces.

As is clearly seen in FIG. 4, the male and female threads have a conical basic shape, and include only a few thread turns. Axially behind the male thread 13, the male element 16 is formed with a first, smooth guide surface 23 having a slightly conical shape. In this section, the part body 11 has a diameter that is smaller than the diameter of the envelope surface 8, whereby an annular shoulder surface 24 is formed between the surfaces 11, 23. Another, external guide surface 25 is formed axially in front of the male thread 13. In this section, the male element 16 has a diameter that is smaller than the diameter of the section 23. Advantageously, the guide surface 25 is cylindrical.

The two guide surfaces 23, 25 are arranged to co-operate with internal guide surfaces 26, 27 in the seating 15 in which the female thread 14 is formed. Among these, the guide surface 26 has a slightly conical shape, while the guide surface 27 is cylindrical. Between the guide surface 26 and the envelope surface of the part body 12, an annular support or end surface 28 extends against which the shoulder surface 24 is pressable.

Because the two threaded joints in the example shown are identical, also the male element 4 and the seating 9 included in the first coupling are formed with the corresponding thread ridges, guide surfaces and ring surfaces, although these are not described in detail. The two seatings 9, 15 in the example are spaced-apart by a partition wall 29, which contributes to stiffen the sleeve-like part body 12. The two male elements 4, 16 are not so long that they touch the bottom in the seatings, i.e., the free end surfaces 30 of the male elements cannot contact the partition wall 29.

As viewed from the respective mouths, the two female threads 10, 14 have the same thread directions, which ultimately depend on in which direction of rotation of the tool is driven. In the example, when the shank-end mill in question rotates in the direction of the arrow R in FIG. 1, the threads are right-threaded. In such a way, it is ensured that the torque applied to the loose top 2 via the sleeve-like part body 12 always acts tightening in both couplings.

Within the scope of the invention, it is possible to form one of the thread couplings sturdier than the other, more precisely, in such a way the co-operating male and female threads 13, 14 between the two part bodies 11, 12 are given a larger diameter (average diameter) than the male and female threads 5, 10 between the basic body and the loose top. A primary effect of such a design is that the flexural rigidity of the axially rearmost thread coupling can be optimized. Another advantage is that the total contact surface between the thread ridges of the rear thread coupling becomes larger than the contact surface between the thread ridges of the front thread coupling. In such a way, it is not risked that the front part body 12 is detached from the rear part body 11 when the loose top 2 is unscrewed from the assembled basic body. In order to additionally reduce the risk of an unintentional detachment of the front part body 12, a friction-increasing medium or a glue may be introduced into the rear thread coupling, e.g., of the type that allows detachment by being heated, but prevent detachment in a cold state.

In FIGS. 1-3, it is seen how not only the loose top 2, but also the front part body 12, may be provided with key grips in the form of pairs of plane surfaces 31, 32.

In the manufacture of the basic body, interconnection of the two part bodies 11, 12 that together form the basic body 1 may advantageously be carried out at a stage before the seating and the female thread of the front end are formed. In other words, in a first step, the male element and male thread of the rear part body and the rear seating and female thread of the front part body are formed, in addition to which the male thread is tightened into the female thread. Not until then, the forming of the seating and the female thread of the front end begins. In such a way, there is ensured an optimum coaxiality between the loose top and the rear part of the basic body that is attached in a machine, more precisely as a consequence of no so-called run-outs arising between the two part bodies.

As to the choice of material in the tool the modulus of elasticity of steel usually is in the range of $200\text{-}210 \times 10^9$ $N/m^2$, while the modulus of elasticity of cemented carbide is about 3 times higher, viz. $600 \times 10^9$ $N/m^2$. It is also possible to use other materials than cemented carbide in the loose top 2 and the primary part body 11, e.g. ceramic. The modulus of elasticity is even higher, viz. about $1000 \times 10^9$ $N/m^2$. Generally the invention is applicable if the modulus of elasticity of the stiffer components 2, 11 is at least 2 times higher than the modulus of elasticity of steel, i.e. about $400 \times 10^9$ $N/m^2$ or more. In this regard it is also possible to use other materials than steel in the secondary body part 12.

An advantage of the invention is that the basic body of a slender tool may be given improved stiffness by, to a major extent, being made of cemented carbide or the like, without impairing the possibilities of forming a thread coupling or another turning coupling, having good dimensional accuracy and precision, between the loose top and the basic body. Thus, a seating, required in the basic body for the male element of the loose top, can be machined internally in, for example, steel, at the same time as a male element included in the cemented carbide body of the basic body can be machined externally. Another advantage is that the expensive part of the basic body, viz. the cemented carbide part, can be re-used even if the front part of the basic body adjacent to the seating and the female thread would be damaged.

The invention is not limited only to the embodiments described above and shown in the drawings. Thus, either of or both the couplings between the three components of the tool may be realized in other ways than in the form of thread couplings, provided that the same make use of male elements that are insertable into seatings and can lock the components in relation to each other by the same being turned in relation to each other. Thus, a bayonet coupling is an alternative to a thread coupling, which like thread couplings include co-operating flank surfaces or flanks, which by wedge action during turning of two components in relation to each other apply an axial force to the components that aims to bring them together. However, in contrast to thread couplings, bayonet couplings usually include only single flanks, which cannot contribute to separate the components when the same are to be detached from each other. For this reason, thread couplings are preferable. In this connection, the two couplings do not need to be of the same type. Thus, one of the couplings may be a thread coupling and the other one a bayonet coupling. Furthermore, the basic body does not necessarily need to have a genuinely cylindrical shape, such as has been exemplified in the drawings. Thus, the rear part of the basic body may be thicker than the front one, or have another cross-section shape than the rest of the basic body. In many applications, the rear part of the basic body may be given an out of round cross-section shape to fit in different machines or driving mechanisms. In case both couplings are thread couplings, these may differ in respect of the thread pitch, the profile shape of the thread ridge, and the basic shape of the thread (conical and cylindrical, respectively). For instance, in the semi-permanent coupling between the two part bodies of the basic body, it is possible to have a thread pitch that is smaller than the thread pitch of the frequently active coupling between the basic body and the loose top. Also, two conical threads may have different conicity, different length, as well as different diameters.

In conclusion, the concept "loose top" should be interpreted in a wide sense and is regarded to include any form of component in which directly or indirectly one or more chip-removing cutting edges are included. For instance, the loose top may be a head (e.g., of steel), which in turn is equipped with replaceable cutting inserts.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A tool for chip removing machining, comprising:
a long narrow basic body having an envelope surface which is concentric with a center axis, and two opposite ends; and
a replaceable loose top which is connected to the basic body via a first coupling that includes a first seating formed in one end of the basic body and a first male element formed in one end of the loose top,
the basic body including a primary part body made of a first material having a first modulus of elasticity, and a secondary part body which includes the first seating and is made of a second material having a second modulus of elasticity which is lower than the first modulus of elasticity,
wherein the two part bodies of the basic body are interconnected via a second coupling which includes a second seating in the secondary part body as well as a second male element that is formed on the primary part body and has one or more precision machined flank surfaces that are arranged to apply, together with one or more co-operating and precision machined flank surfaces of the second seating, joining axial forces to the part bodies by turning the part bodies in relation to each other.

2. The tool according to claim 1, wherein the first coupling between the basic body and the loose top is a first threaded joint including a female thread of the first seating and a male thread of the first male element.

3. The tool according to claim 2, wherein the second coupling between the two part bodies of the basic body is a second threaded joint including a female thread of the second seating and a male thread of the second male element.

4. The tool according to claim 3, wherein the co-operating male and female threads of the first and second threaded joints respectively have a conical basic shape.

5. The tool according to claim 1, wherein the secondary part body includes a partition wall between the first and second seatings.

6. The tool according to claim 3, wherein the female thread of the first seating of the secondary part body and the female thread of the second seating of the secondary part body have the same thread directions.

7. A long narrow basic body for tools for chip removing machining, the basic body having an envelope surface which is concentric with a center axis, two opposite ends, and a first seating formed in one end that receives a first male coupling element, the basic body comprising:
a primary part body made of a material having a first modulus of elasticity; and
a secondary part body which includes the first seating and is made of a material having a second modulus of elasticity which is lower than the first modulus of elasticity,
wherein the two part bodies are interconnected via a coupling, which includes a second seating in the secondary part body, and a second male element that is formed on the primary part body and has one or more precision machined flank surfaces that are arranged to apply, together with one or more co-operating precision machined flank surfaces of the second seating, joining axial forces to the part bodies by turning the part bodies in relation to each other.

8. The basic body according to claim 7, wherein the flank surfaces are included in a threaded joint in the form of a male thread of the second male element and a female thread of the second seating.

9. The basic body according to claim 8, wherein the first seating includes a female thread that has the same thread direction as the female thread of the second seating.

10. The basic body according to claim 9, wherein the female thread of the second seating has a larger diameter than the female thread of the first seating.

11. The basic body according to claim 7, wherein the material of the secondary part body is steel, and the material of the primary part body is selected from the group of: cemented carbide, ceramics and cermet.

12. The basic body according to claim 7, wherein an annular shoulder surface between the second male element of the primary part body and the envelope surface is pressed against an annular support surface between the envelope surface of the secondary part body and the second seating.

13. The tool according to claim 1, wherein the first material is cemented carbide.

14. The tool according to claim 13, wherein the second material is steel.

15. The tool according to claim 1, wherein the second material is steel.

16. The tool according to claim 1, wherein the first modulus of elasticity is approximately two times the second modulus of elasticity.

17. The tool according to claim 1, wherein the first modulus of elasticity is generally in the range of $600 \times 10^9$ N/m$^2$–$1000 \times 10^9$ N/m$^2$ and the second modulus of elasticity is in generally in the range of $200 \times 10^9$ N/m$^2$–$210 \times 10^9$ N/m$^2$.

* * * * *